(12) United States Patent
Yan et al.

(10) Patent No.: US 8,031,433 B2
(45) Date of Patent: Oct. 4, 2011

(54) METHOD TO MAKE AN INTEGRATED SIDE SHIELD PMR HEAD WITH NON CONFORMAL SIDE GAP

(75) Inventors: Cherng-Chyi Yan, San Jose, CA (US); Feiyue Li, Fremont, CA (US); Shiwen Huang, Fremont, CA (US); Jiun-Ting Lee, Sunnyvale, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 607 days.

(21) Appl. No.: 12/231,756

(22) Filed: Sep. 5, 2008

(65) Prior Publication Data

US 2010/0061016 A1    Mar. 11, 2010

(51) Int. Cl.
*G11B 5/127* (2006.01)

(52) U.S. Cl. ......... 360/125.03; 360/125.04; 360/125.11; 360/125.15

(58) Field of Classification Search ............. 360/125.03, 360/125.04, 125.11, 125.15
See application file for complete search history.

(56) References Cited

U.S. PATENT DOCUMENTS

2007/0253107 A1   11/2007   Mochizuki et al.
2008/0100959 A1   5/2008   Feldbaum et al.

OTHER PUBLICATIONS

"One Terabit per Square Inch Perpendicular Recording Conceptual Design," by M. Mallary et al., IEEE Transactions on Magnetics, vol. 38, No. 4, Jul. 2002, pp. 1719-1724.
Co-pending US Patent HT06-036, U.S. Appl. No. 11/787,015, filed Apr. 13, 2007, "Optimized Write Pole Flare Angle for Side Shield or Semi Side Shield PMR Writer Application," assigned to the same assignee as the present invention.
Co-pending US Patent HT07-050, U.S. Appl. No. 12/072,272, filed Feb. 25, 2008, "A Method to Make PMR Head with Integrated Side Shield (ISS)," assigned to the same assignee as the present invention.

*Primary Examiner* — Ly D Pham
(74) *Attorney, Agent, or Firm* — Saile Ackerman LLC; Stephen B. Ackerman

(57) ABSTRACT

A non-conformal integrated side shield structure is disclosed for a PMR write head wherein the sidewalls of the side shield are not parallel to the pole tip sidewalls. Thus, the side gap distance between the leading pole tip edge and side shield is different than the side gap distance between the trailing pole tip edge and side shield. As a result, there is a reduced side fringing field and improved overwrite performance. The side gap distance is constant with increasing distance from the ABS along the main pole layer. A fabrication method is provided where the trailing shield and side shield are formed in the same step to afford a self-aligned shield structure. Adjacent track erasure induced by flux choking at the side shield and trailing shield interface can be eliminated by this design. The invention encompasses a tapered main pole layer in a narrow pole tip section.

20 Claims, 7 Drawing Sheets

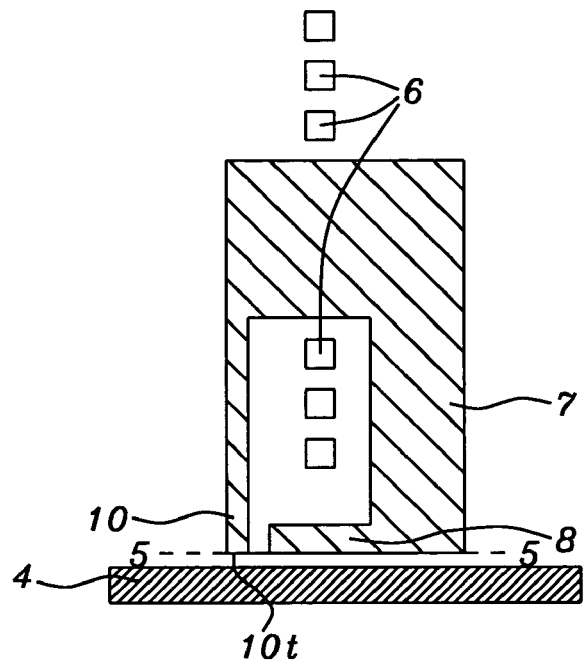
FIG. 1 – Prior Art
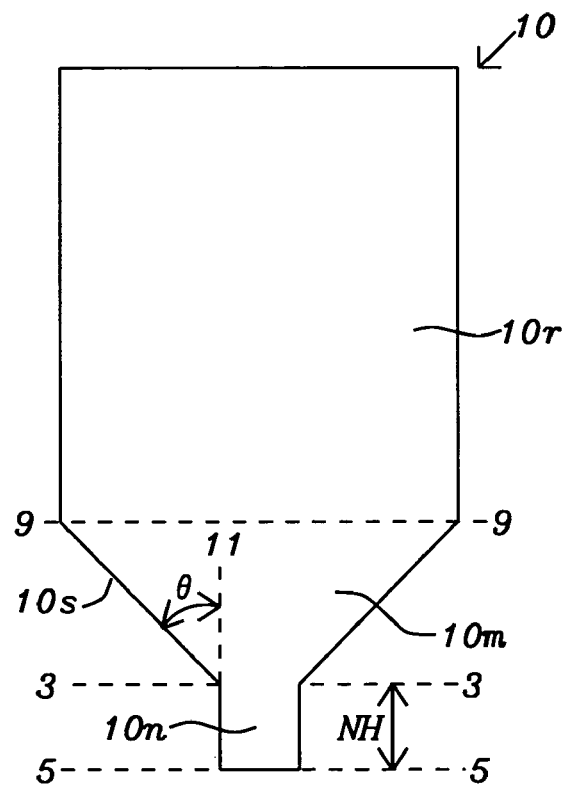
FIG. 2 – Prior Art

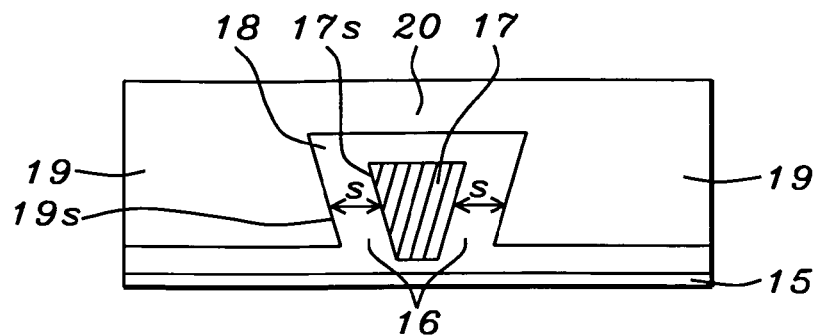
FIG. 3 – Prior Art
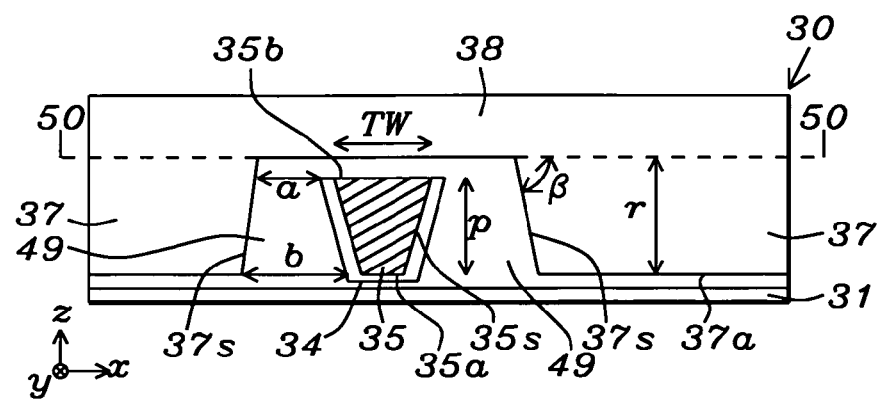
FIG. 4
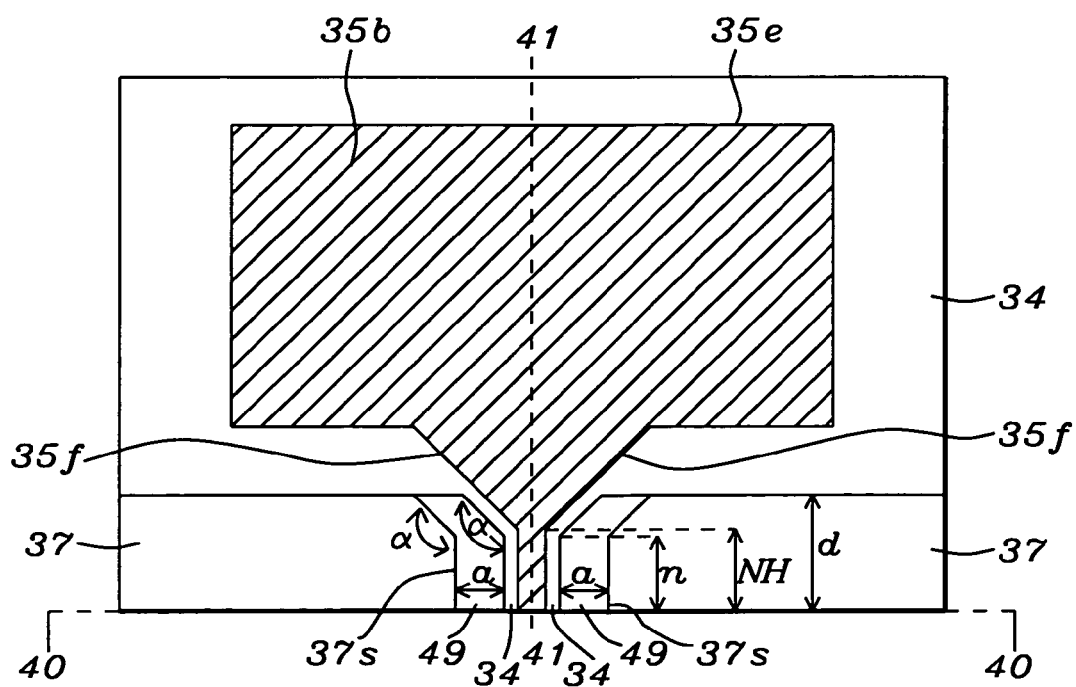
FIG. 5

US 8,031,433 B2

METHOD TO MAKE AN INTEGRATED SIDE SHIELD PMR HEAD WITH NON CONFORMAL SIDE GAP

RELATED PATENT APPLICATIONS

This application is related to the following: Ser. No. 11/787,015, filing date Apr. 13, 2007; and Ser. No. 12/072,272, filing date Feb. 25, 2008; both assigned to a common assignee and herein incorporated by reference in their entirety.

FIELD OF THE INVENTION

The invention relates to a non-conformal integrated side shield PMR head structure and a method for forming the same in which a side shield and trailing shield are formed in one process step so that side fringing is minimized and an acceptable overwrite level is maintained.

BACKGROUND OF THE INVENTION

Perpendicular magnetic recording (PMR) has been developed in part to achieve higher recording density than is realized with longitudinal magnetic recording (LMR) devices and is believed to be the successor of LMR for next generation magnetic data storage products and beyond. The advantages of PMR associated with a soft underlayer (SUL) from PMR media can reduce both sensor track width (MRW) and magnetic write width (MWW) significantly. A single pole writer combined with a soft magnetic underlayer also has the intrinsic advantage of delivering higher write field than LMR heads. However, side fringing from a trailing shield PMR head is substantially larger than in LMR. The large side fringing for PMR heads is a primary concern for the push to higher track density (TPI) and is a major constraint to PMR extendability.

A conventional PMR write head as depicted in FIG. 1 typically has a main (write) pole 10 with a small surface area (pole tip) at an air bearing surface (ABS) 5 and a flux return pole (opposing pole) 8 which is magnetically coupled to the write pole through a trailing shield 7 and has a large surface area at the ABS. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip at the ABS is high enough to switch magnetizations in the recording media 4. A trailing shield (not shown) is added to improve the field gradient in the down-track direction.

In FIG. 2, a top view is shown of a typical write pole layer 10 otherwise known as the main pole layer or main write pole. The write pole 10 has a narrow section 10n that extends a neck height (NH) distance from the ABS plane 5-5 to a plane 3-3 parallel to the ABS where a middle section 10m having sides 10s flares out at an angle θ from a dashed line 11 that is an extension of one of the sides of narrow section 10n. There is also a third main write pole section 10r that has one end at the plane 9-9 where the flared sides 10s terminate and extends a certain distance away from the plane 9-9 in a direction perpendicular to the ABS.

To achieve high areal recording density with PMR technology, key requirements for the PMR writer design are to provide large field magnitude and high field gradient in both down-track and cross-track directions. In practice, these two requirements are often traded off with each other to balance the overall performance. There are two approaches to achieve these requirements. One approach involves optimizing the geometry of the main write pole such as modifying the values for NH and flare angle θ. A short NH or large θ can increase write field magnitude effectively. However, too short of a NH leads to problems of meeting process tolerance during manufacturing while too large of a flare angle θ may cause a large amount of adjacent track erasure (ATE) because of a large fringe field. In today's commercial PMR writer products, NH is generally above 0.1 micron and flare angle θ is kept less than 45 degrees. A second design approach involves applying magnetic shield structure in the vicinity of the main write pole as described by M. Mallary in "One Terabit per Square Inch Perpendicular Recording Conceptual Design", IEEE, Trans. Magn., Vol. 38, July, 2002. To further improve cross-track field gradient, a full side shield writer structure is used to limit the excessive fringe field onto the adjacent track. Depending on the spacing between the side shield and the write pole, field magnitude could drop below the minimal performance requirement. As a result, flux intensity will be reduced at the ABS and writability will decrease.

As recording density keeps increasing, the trade-off between writability and field gradient becomes more challenging. Therefore, all the design elements must be integrated and optimized simultaneously to achieve best performance. Unfortunately, none of the prior art structures provide satisfactory control of field magnitude and field gradient in both the down-track and cross-track directions. Therefore, an improved write structure is necessary to achieve the high performance required for advanced devices with narrow track widths and high recording density.

A search of the prior art revealed the following references. U.S. Patent Application 2007/0253107 shows that a trailing shield and side shield may be a single piece. A non-conformal side gap is depicted where the side gap length between a side shield and pole tip section narrows with increasing distance from the ABS.

In U.S. Patent Application 2008/0100959, a conformal side gap is illustrated where the side gap is larger than the write gap.

SUMMARY OF THE INVENTION

One objective of the present invention is to provide a PMR writer structure that decreases side fringing fields while maintaining sufficient write field magnitude for applications with high recording density and having narrow track widths.

Another objective of the present invention is to provide a PMR writer structure with an integrated side shield in which the side shield and trailing shield are formed in the same process step to avoid flux choking at a side shield/trailing shield interface.

According to the present invention, these objectives are achieved in an improved PMR design that includes a main pole layer with a non-conformal side shield and a trailing shield structure that improves writability and cross-track field gradient. The main pole layer is comprised of a narrow section having one end (pole tip) at the ABS plane and a second end along a second plane that is parallel to the ABS and located a neck height (NH) distance from the ABS when observed from a top view. The remainder of the main pole layer extends away from the second plane and may be comprised of a second flared section with an end that adjoins one end of the narrow section at the NH distance and with two sides that flare outward at an angle θ from the two sides of the narrow section. The two flared sides adjoin the main body of the main pole proximate to a throat height distance from the ABS. The main body of the write pole may have a rectangular shape or other shapes used in the art.

Viewed from the ABS plane, the pole tip has a leading or bottom edge disposed above a substrate, a top or trailing edge opposite the leading edge, and two sides that connect the leading and trailing edges. The top edge typically has a greater width than the bottom edge and determines the track width. The main pole layer including the narrow section is formed in an opening within a first dielectric layer that may be comprised of alumina. In one aspect, a second dielectric layer is formed on the sidewalls and bottom of the opening to adjust the track width. A main pole seed layer is disposed on the thin second dielectric layer within the opening. The remainder of the opening is comprised of a main pole layer material such as CoFe that is disposed on the main pole seed layer and has a top surface coplanar with the first dielectric layer. A write gap layer made of a dielectric material such as alumina is formed on the narrow pole section, flared pole section, and above a portion of the main pole layer adjacent to the flared pole section.

Adjacent to the first dielectric layer adjoining the sides of the narrow pole section and a portion of the flared pole section is a third dielectric layer. A side shield layer adjoins the third dielectric layer and extends from the ABS to a certain distance from the ABS that is preferably greater than the neck height. The first, second, and third dielectric layers formed between the narrow pole section and a side shield comprise a side gap. A key feature is that the side shield layer is not conformal to the narrow pole section. In other words, a side of the side shield layer facing the narrow pole section and flared section is not parallel to the nearest side of the aforementioned main pole layer sections. Therefore, the side gap distance between the top edge of the pole tip and the side shield is less than the side gap distance between the bottom edge and the side shield. A trailing side shield is formed on the write gap layer along the ABS and adjoins the side shield layer to give a contiguous magnetic layer on three sides of the narrow rectangular pole section. The trailing shield may have a rectangular shape with one long side formed in a cross-track direction along the ABS and two short sides perpendicular to the ABS.

In one embodiment, the side shield layer is comprised of a full side shield having a section along each side of the narrow pole section and pole tip where each section has a top surface, bottom surface, and a thickness that is essentially the same as the thickness of the pole tip in a down-track direction. The top surface of the side shield may be coplanar with the top surface of the narrow pole section or slightly offset below the top surface. Likewise, the bottom surface of the side shield may be coplanar with the bottom surface of the narrow pole section or slightly offset above the bottom surface.

The PMR structure may be fabricated by depositing a first dielectric layer made of alumina on a substrate. The substrate may be a top shield layer in a read head, and also serves as a flux return pole and the bottom layer in a write head portion of a merged read/write head. An opening is formed in the first dielectric layer by a conventional photolithography and etching process and corresponds to the intended shape of the main pole layer from a top view. The opening typically has sloped sidewalls and includes a trench perpendicular to the ABS. A second dielectric layer made of alumina or the like may be deposited by an atomic layer deposition (ALD) method on the first alumina layer and covers the sidewalls and bottom of the opening. Thereafter, a plating seed layer such as Ru which also functions as a chemical mechanical polish (CMP) stopper layer is deposited by an ion beam deposition (IBD) method on the second dielectric layer. Next, the main pole layer is electroplated on the plating seed layer to fill the opening. Following a field etch, an alumina layer is deposited on the main pole layer and field area to fill in the troughs in the uneven top surface of the main pole layer. A chemical mechanical polish (CMP) process is performed and stops on the plating seed layer above the first dielectric layer thereby planarizing the main pole layer to be coplanar with the plating seed layer. Subsequently, an ion beam etch (IBE) may be employed to taper the main pole layer in a region adjacent to the ABS.

From a side view along a plane that is perpendicular to the ABS, the main pole layer is typically tapered such that the thickness of the narrow pole section adjacent to the ABS is less than the thickness of the main pole layer which is formed a greater distance than the throat height from the ABS. The first dielectric layer is exposed along the ABS and for a certain distance towards the back end of the main pole layer. A second photopatterning and RIE sequence is performed to remove portions of the exposed first dielectric layer except a region proximate to the narrow pole section and an adjacent portion of the second flared section and thereby creates a side shield cavity on either side of the narrow pole section and along a portion of the flared section.

A third dielectric layer may then be deposited by an ALD process on the substrate, over the first dielectric layer, and on the main pole layer. The portion of the third dielectric layer disposed on the main pole layer serves as a write gap. The resulting sidewalls of the third dielectric layer proximate to the narrow pole section are essentially vertical or may be slightly sloped. A third photoresist patterning and IBE sequence is employed to form an opening in the write guard above a portion of the main pole layer where a top yoke will subsequently be deposited. Thereafter a seed layer is deposited on the write gap and on exposed portions of the main pole layer. A magnetic layer is deposited on the seed layer and comprises a side shield on opposite sides of the narrow pole section, a trailing shield above the write gap and adjacent to the ABS, and a top yoke in the opening on the main pole layer.

An opening is formed in the magnetic layer between the trailing shield and top yoke and exposes the seed layer above a horizontal section of the write guard. The seed layer in the opening is removed by an IBE process. Next, a physical vapor deposition (PVD) is used to fill the opening between the trailing shield and top yoke with alumina or another insulator material. A CMP process is performed to planarize the alumina layer to be coplanar with the top surfaces of the trailing shield and top yoke. The remainder of the write head is formed by conventional steps known to those skilled in the art.

BRIEF DESCRIPTION OF THE DRAWINGS

FIG. 1 is a cross-sectional view of a conventional PMR writer showing the main write pole, flux return pole, magnetic recording media, and coils that generate magnetic flux.

FIG. 2 is a top view showing a main pole layer of a conventional PMR write head that has a narrow pole section adjacent to the ABS and a larger section with sides that flare outward at an angle θ from the sides of the narrow pole section.

FIG. 3 is a cross-sectional view from an ABS plane that shows a conformal side shield design that was previously fabricated by the inventors.

FIG. 4 is a cross-sectional view of an integrated side shield structure in a PMR write head with a non-conformal side gap according to one aspect of the present invention.

FIG. 5 is a top view of the integrated side shield structure in FIG. 4 where the top shield and overlying layers in the write head have been removed.

DETAILED DESCRIPTION OF THE INVENTION

Figure 6:
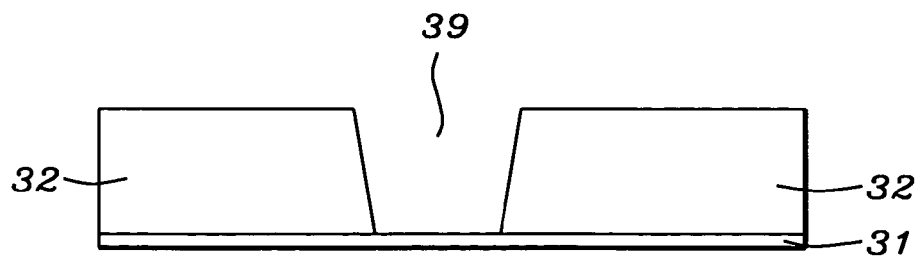
FIG. 6 is a cross-sectional view from an ABS that shows the formation of an opening in a first dielectric layer which corresponds to the intended shape of the main pole layer to be deposited in a later step according to one embodiment of the present invention.

The present invention is a PMR writer comprised of an integrated side shield structure with a non-conformal side gap where the side shield and a trailing shield form a single piece on a write gap. The drawings are provided by way of example and are not intended to limit the scope of the invention. The exemplary embodiment depicts a PMR writer comprised of a merged read/write head configuration. However, the PMR writer of the present invention is not limited to a merged PMR read-write head and may encompass other PMR writer configurations as appreciated by those skilled in the art.

Referring to FIG. 3, a conformal side shield structure previously fabricated by the inventors and disclosed in patent application Ser. No. 12/072,272 is depicted. Side gaps 16 are made of alumina and are disposed on a substrate 15. A side shield 19 is formed adjacent to a side gap 16 and has a sidewall 19s that is essentially parallel to the nearest side 17s of the pole tip section 17. Thus, side gaps 16 have a constant width s. Above the pole tip section is a write gap 18 and a trailing shield 20. In the conformal side shield structure, there is significant main pole flux leakage to the side shield 19 that will cause lower overwrite. Thus, we are motivated to modify the side shield design and thereby minimize the flux leakage from the main pole to the side shield by enlarging side gap width. Furthermore, a fabrication scheme which requires fewer steps than used to make a conformal side shield structure is desirable.

Referring to FIG. 4, a cross-sectional view from an air bearing surface (ABS) illustrates a non-conformal integrated side shield PMR head 30 according to one embodiment of the present invention. There is a main pole layer 35 which has a pole tip exposed at the ABS. The pole tip is comprised of a bottom edge 35a, a top edge 35b, and two sides 35s and is adjoined on the bottom and two sides by a seed layer 34. The pole tip and seed layer 34 are enclosed in an alumina layer 49 that is typically comprised of a plurality of alumina layers including a write gap between the top edge 35b and trailing shield 38 as explained in a later section. The alumina layer 49 separates the side shield 37 from a substrate 31 that may be a separation layer formed between a read head and a write head in a merged PMR read-write head, for example. Alumina layer 49 also separates the side shield 37 from seed layer 34 and pole tip sides 35s. Side shield 37 with thickness r and trailing shield 38 form a single magnetic piece and are adjoined along a plane 50-50. Track width TW is the width of the top edge 35b along the ABS.

It should be understood that the main pole layer 35 has a top surface 35b that extends from the ABS to the back end of the device 35e as illustrated in FIG. 5. There are additional layers above the trailing shield 38 in the write head which are not shown in order to simplify the drawing (FIG. 4). Furthermore, the substrate 31 may be part of a slider (not shown) formed in an array of sliders on a wafer. After the PMR write head 30 is completed, the wafer is sliced to form rows of sliders. Each row is typically lapped to afford an ABS before dicing to fabricate individual sliders that are used in a magnetic recording device.

Returning to FIG. 4, a key feature of the present invention is that the shape of the side gap which is the portion of the alumina layer 49 between side shield 37 and seed layer 34 does not conform to the slope of sidewalls 35s in pole tip 35. In other words, the side gap distance a of about 0.06 to 0.5 microns, and preferably 0.10 microns, proximate to the top edge 35b is less than the side gap distance b of about 0.1 to 0.55 microns, and preferably 0.14 microns, proximate to the lower edge 35a. In particular, sidewall 37s of side shield 37 is not parallel to sidewall 35s of the main pole layer 35. In the exemplary embodiment, sidewall 37s forms an angle β of 90° or slightly less than 90° with respect to the plane 50-50 that is parallel to the plane of the substrate 31 and orthogonal to the ABS. Write gap distance between top edge 35b and trailing shield 38 is between 300 and 500 Angstroms. Pole tip thickness p is typically between 0.15 and 0.25 microns.

Referring to FIG. 5, a top view of the PMR write head in FIG. 4 is depicted in which all layers above the main pole layer 35 are removed to simplify the drawing and show the layout of the side shield 37 with respect to the main pole layer 35 near the ABS 40-40. The length d of the side shield 37 is about 0.1 to 0.5 microns and extends from the ABS 40-40 toward the backend 35e of the main pole layer 35. Note that the side gap distance a is uniform between side shield sidewall 37s and seed layer 34 as a function of distance from the ABS. In another embodiment, the side gap distance a (and b not shown) may become slightly larger as a function of distance from the ABS. In general, a constant side gap distance a (and b) is preferred as a function of distance from the ABS since that configuration is easier to reproduce on a manufacturing scale.

In the exemplary embodiment, the seed layer 34 conforms to the shape of the main pole layer and flares at an angle α outward along the flared sides 35s with respect to a plane (not shown) that is parallel to the plane 41-41. The plane 41-41 is perpendicular to the ABS 40-40 and bisects the main pole layer 35. The bend in seed layer 34 which gives rise to angle a typically occurs at a distance n from the ABS where n is less than the neck height NH where the narrow pole section adjacent to the ABS 40-40 joins the flared sidewalls 35f of the main pole layer shown with a top surface 35b. Likewise, side shield sidewall 37s flares outward at an angle a with respect to a plane (not shown) that is parallel to the plane 41-41 at a distance n from the ABS 40-40.

Returning to FIG. 4, in a preferred embodiment the side shield 37 may be considered a full side shield as the thickness r of the side shield is essentially equal to the thickness p of the pole tip 35. In one embodiment (not shown), the top surface of side shield 37 along plane 50-50 may be coplanar with top surface of the main pole layer (edge 35b) and the bottom surface 37a of the side shield may be coplanar with the bottom surface of the main pole layer (bottom edge 35a). In an alternative embodiment, the top surface of side shield 37 lies on plane 50-50 and is offset by a certain distance above the top edge 35b. Optionally, the bottom surface 37a may be offset above the bottom edge 35a by a certain distance. The offset of the top surface along plane 50-50 and bottom surface 37a may be from 0 to about 0.15 microns from the top edge 35b and bottom edge 35a, respectively, along the down-track direction which is along the z-axis. The main pole layer 35 is preferably comprised of CoFe or an alloy thereof while side shield 37 and trailing shield 38 are preferably comprised of CoNiFe or the like.

Referring to FIGS. 6-20, the present invention also encompasses a method of fabricating the aforementioned non-conformal integrated side shield structure. With regard to FIG. 6 which is a view from the ABS, a first dielectric layer 32 is deposited on substrate 31 that was described previously. The first dielectric layer 32 may be comprised of alumina and may be formed by a physical vapor deposition (PVD) process, for example. An opening 39 is generated by a conventional photoresist patterning and etching sequence and corresponds to the intended shape of the main pole layer to be deposited in a subsequent step. The etch process may involve reactive ion etching (RIE) if a photoresist mask is employed or ion beam etching (IBE) when a metal mask is used. Optionally, first dielectric layer 32 may be made of silicon oxide or other insulation materials employed by those skilled in the art.

Figure 7:
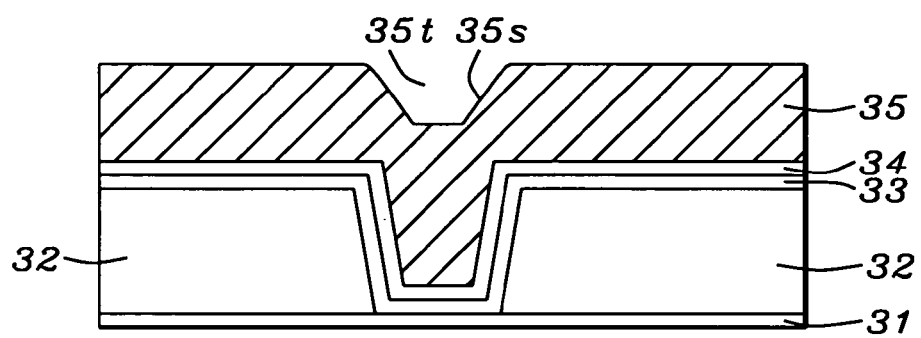
FIG. 7 is a cross-sectional view after a second dielectric layer, seed layer, and main pole layer are sequentially formed in the opening in FIG. 6.

Referring to FIG. 7, a conformal second dielectric layer 33 made of alumina or the like is deposited by an ALD method within the opening 39 and on first dielectric layer 32. The second dielectric layer 33 is between 100 to 300 Angstroms thick and is used as a conformal liner in the opening 32 in order to adjust the track width. Next, a seed layer 34 that also functions as a CMP stopper in a later processing step is deposited on second dielectric layer 33 by ion beam deposition, for example. The seed layer 34 is preferably Ru and also conforms to the shape of the opening 39. Thereafter, the main pole layer 35 is electroplated on the seed layer 34 to fill the opening 39 and results in an uneven top surface 35s having a trough 35t in regions above filled opening 39.

Figure 8:
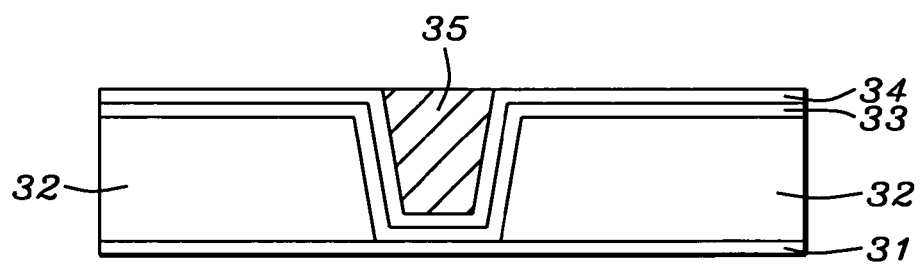
FIG. 8 is a cross-sectional view after a field etch, alumina deposition and CMP process are performed to planarize the main pole layer in FIG. 7.

Referring to FIG. 8, a field etch which is a chemical etch is performed to remove the electroplated layer in regions outside the photoresist mask which covers the device area. Next, an alumina layer (not shown) is deposited by a PVD method on the main pole layer and adjoining regions in order to fill in the troughs 35t within the uneven top surface 35s. A CMP process is then used to form a planar surface where main pole layer 35 is coplanar with the seed layer 34 that remains above first dielectric layer 32.

Figure 9:
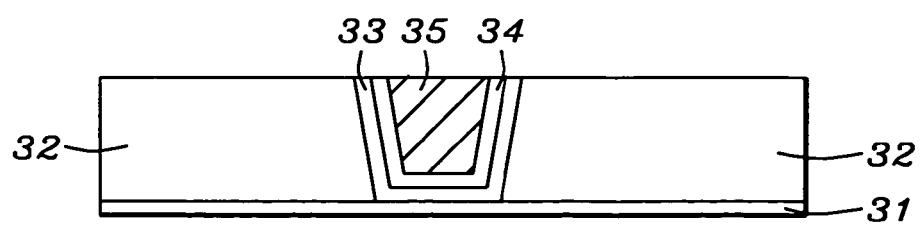
FIG. 9 is a cross-sectional view of the PMR write head in FIG. 8 after the seed layer is removed above the first dielectric layer by an IBE process.

Referring to FIG. 9, a second photoresist patterning and etching sequence is performed to remove a portion of the seed layer 34 along the ABS. In one embodiment, an IBE process is employed with a vertical directionality to remove the seed layer 34 in exposed regions. Subsequently, a second IBE process with an angular component is used to etch the main pole layer 35 in exposed regions adjacent to the ABS and thereby produce a taper such that the thickness of the narrow pole section and second flared section is less than that of the main body of the main pole layer.

Figure 10:
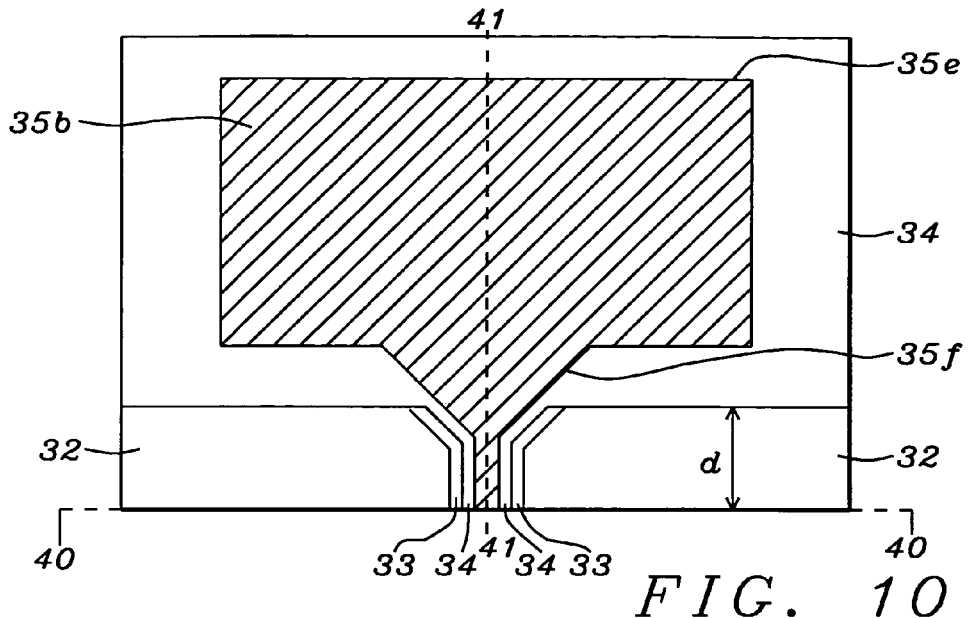
FIG. 10 is a top view of the PMR write head in FIG. 9.

In FIG. 10, a top view of the PMR structure in FIG. 9 is depicted and shows a plane 41-41 that bisects the main pole layer with top surface 35b and is orthogonal to the ABS 40-40. A portion of first dielectric layer 32 and adjacent regions of seed layer 34, second dielectric layer 33, and the narrow section of main pole layer 35b are uncovered by the aforementioned IBE process. Thus, a rectangular shaped section of seed layer 34 has been removed in a region that extends a distance d of about 0.1 to 0.5 microns from the ABS 40-40. All of the narrow section of the main pole layer top surface 35b and a portion of the flared section bounded by flared sides 35f are uncovered. Note that seed layer 34 remains in filled opening 39 that is bisected by plane 41-41.

Figure 11:
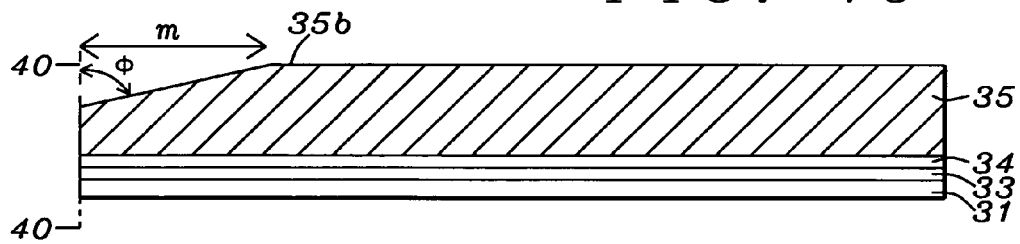
FIG. 11 is a side view of the PMR write head in FIG. 9.

Referring to FIG. 11, a side view of the PMR structure in FIG. 10 is shown along the plane 41-41. Note that the thickness of the main pole layer gradually increases with increasing distance m from the ABS 40-40. The angle φ formed by the intersection of the ABS 40-40 and top surface 35b adjacent to the ABS is about 30 to 40 degrees.

Figure 12:
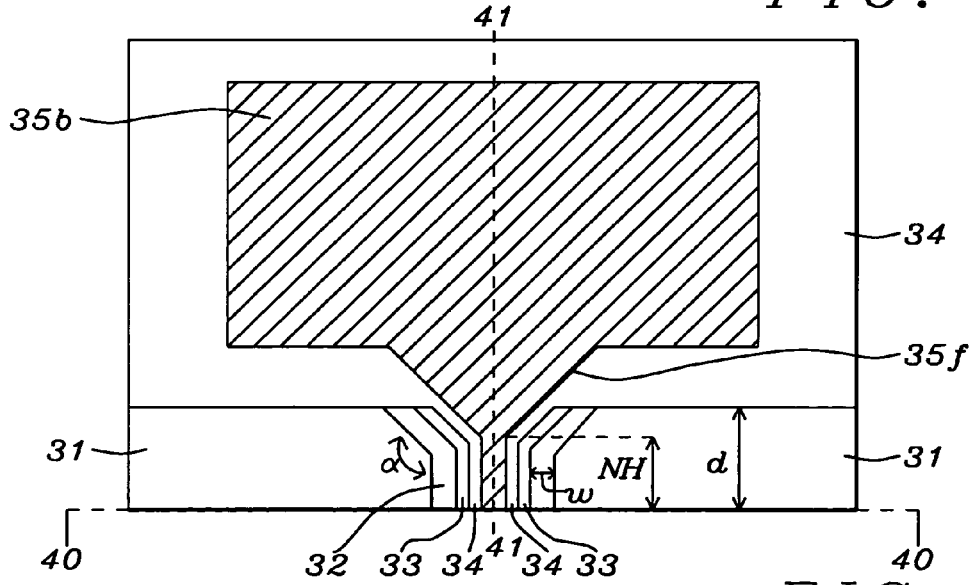
FIG. 12 is a top view of the PMR write head in FIG. 10 after a side shield cavity is formed on either side of the pole tip at the ABS according to the present invention.

In FIG. 12, a top view is shown of the PMR structure in FIG. 10 after a third photoresist patterning and etch sequence is employed to selectively remove exposed portions of first dielectric layer 32 but leaving a strip having a width w along the second dielectric layer 33 on either side of the plane 41-41. Note that the first dielectric layer 32 bends at an angle α away from the plane 41-41 at a distance (n in FIG. 5) from the ABS slightly less than the neck height NH where sides 35f intersect with the narrow pole section. The width w is constant with increasing distance from the ABS 40-40 and is between 0.03 and 0.47 microns depending on the track width.

Figure 13:
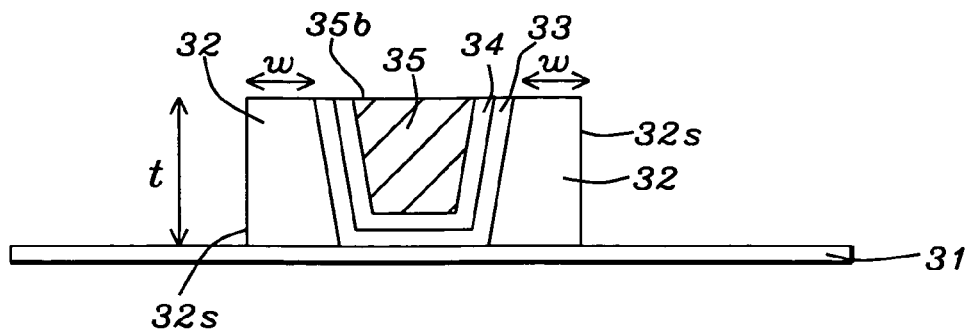
FIG. 13 is a cross-sectional view of the PMR write head in FIG. 12 that shows the first dielectric layer is trimmed to create a side shield cavity.

Referring to FIG. 13, a cross-sectional view of the PMR structure in FIG. 12 is illustrated. Portions of the substrate 31 are exposed as a result of the previous first dielectric layer trim etch. The first dielectric layer 32 has a thickness t and may have sidewalls 32s that are vertical or slightly sloped away from the pole tip 35.

Figure 14:
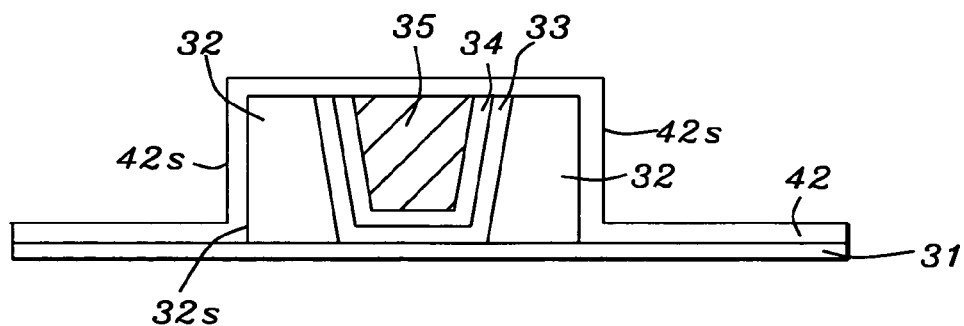
FIG. 14 is a cross-sectional view of the PMR write head in FIG. 13 after a third dielectric layer is deposited on the substrate, main pole, and first dielectric layer.

Referring to FIG. 14, a third dielectric layer 42 that may be comprised of alumina is preferably deposited by an ALD method on substrate 31, first dielectric layer 32, and on main pole layer 35. Third dielectric layer 42 has a thickness h of 300 to 500 Angstroms and typically has sidewalls 42s that conform to the sidewalls 32s. The horizontal portion of the third dielectric layer 42 formed above the main pole layer 35 serves as a write gap. In one embodiment, the dielectric layers 32, 33, 42 are all comprised of alumina. In another aspect, one or more of the dielectric layers 32, 33, 42 may be comprised of another dielectric layer that is not alumina.

Figure 15:
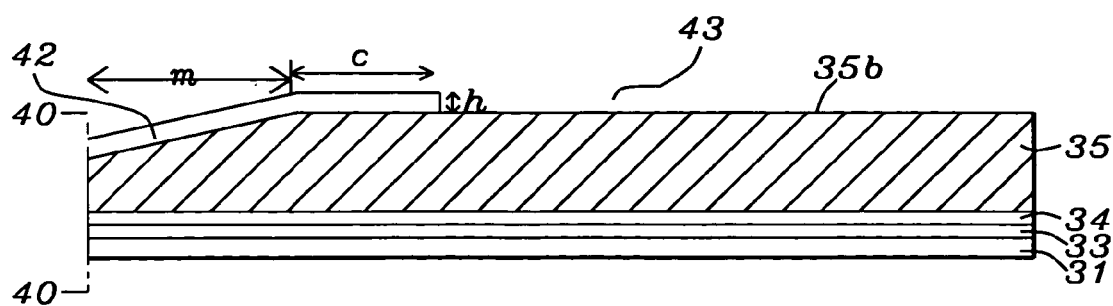
FIG. 15 is a side view of the PMR write head in FIG. 14 following an etch to remove a portion of the third dielectric layer (write guard) above the main pole layer.

Referring to FIG. 15, a side view of the PMR structure in FIG. 14 is shown after a fourth photoresist patterning and etching sequence is used to form an opening 43 in the write gap 42 above the main pole layer 35 and exposes a portion of the top surface 35b where a top yoke will be deposited in a later step. The write gap 42 extends for a distance m+c of about 3 microns from the ABS 40-40.

Figure 16:
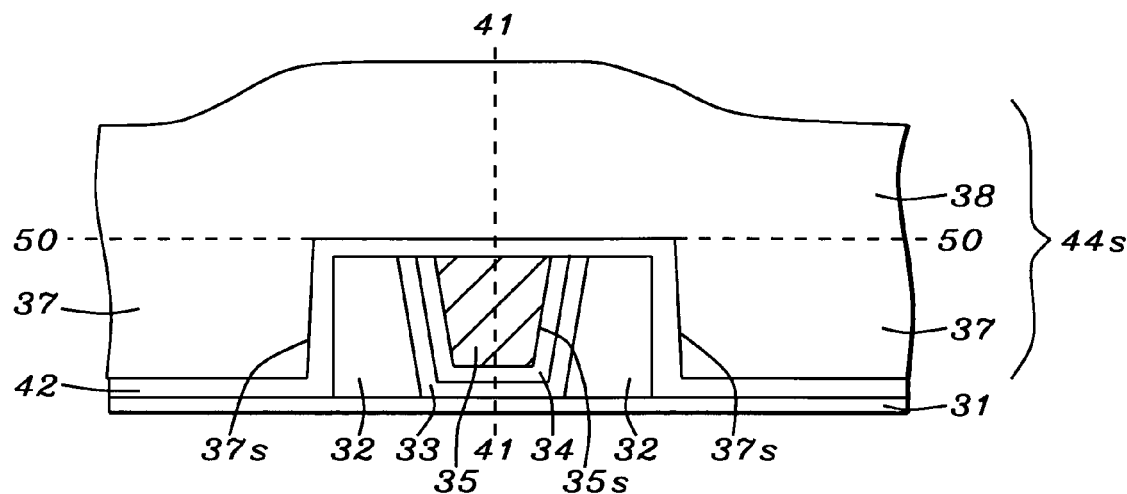
FIG. 16 is a cross-sectional view of the PMR write head in FIG. 15 after a magnetic layer is deposited to form side shields, a trailing shield, and a top yoke.

Referring to FIG. 16, a trailing shield seed layer (not shown) is deposited on the third dielectric layer 42 including the write gap portion thereof and on a portion of main pole layer 35 at a distance greater than m+c from the ABS 40-40. Thereafter a magnetic layer 44 comprised of a front section 44s adjacent to ABS and a back section 44y (FIG. 17) above the main body of the main pole layer 35 is electroplated using a method known to those skilled in the art. Front section 44s comprises side shield 37 below plane 50-50 and trailing shield 38 above plane 50-50. Side shield 37 and trailing shield 38 are considered self-aligned since they are a single piece and are formed during the same process step. A key feature is that the side walls 37s of side shield 37 do not conform to the sidewalls 35s of main pole layer 35 as mentioned previously. In other words, sidewall 37s is not parallel to the nearest sidewall 35s.

Figure 17:
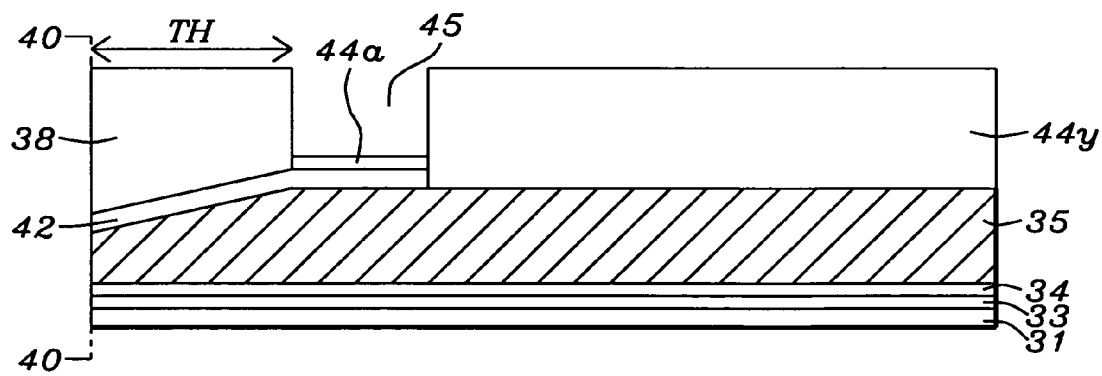
FIG. 17 is a side view of the PMR write head in FIG. 16 showing an opening formed above the write guard and between the trailing shield and top yoke.

Referring to FIG. 17, a side view of the PMR structure in FIG. 16 is shown along the plane 41-41 that bisects the main pole layer 35 after a photoresist layer (not shown) is removed by a conventional stripping process. There is an opening 45 separating the trailing shield 38 (in front section 44s) from the top yoke (back section 44y). Opening 45 which is a trench from a top view (not shown) is formed by removing the aforementioned photoresist layer that occupied the opening during the electroplating of magnetic layer 44. The trailing shield seed layer 44a is shown on write gap 42 at the bottom of opening 45. The distance between the ABS 40-40 and the opening 45 is defined as the throat height (TH).

Figure 18:
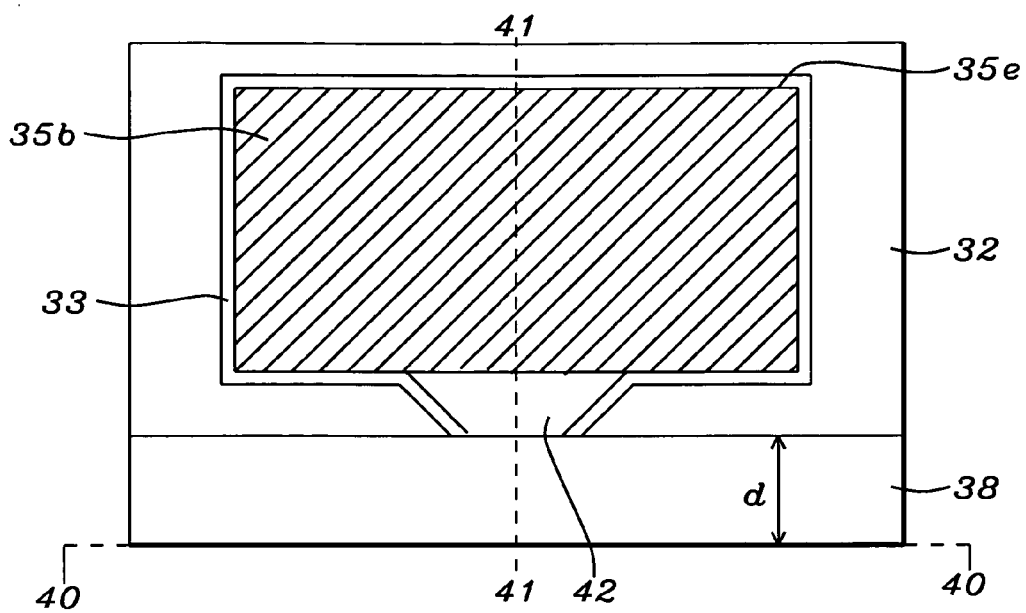
FIG. 18 is a top view of the PMR write head in FIG. 17 after the seed layer is removed within the opening between the trailing shield and top yoke.

Referring to FIG. 18, a top view of the PMR structure in FIG. 17 is illustrated after the trailing shield seed layer 44a is removed from within opening 45 and seed layer 34 is removed from the perimeter of main pole layer 35 by an IBE process. Second dielectric layer 33 is now shown along the outer edge of the main pole layer top surface 35b. First dielectric layer 32 surrounding the main pole layer 35 is also uncovered by the IBE step. The trailing shield 38 has a length d which is equivalent to the throat height from the ABS 40-40 toward the back end 35e of the main pole layer 35.

Figure 19:
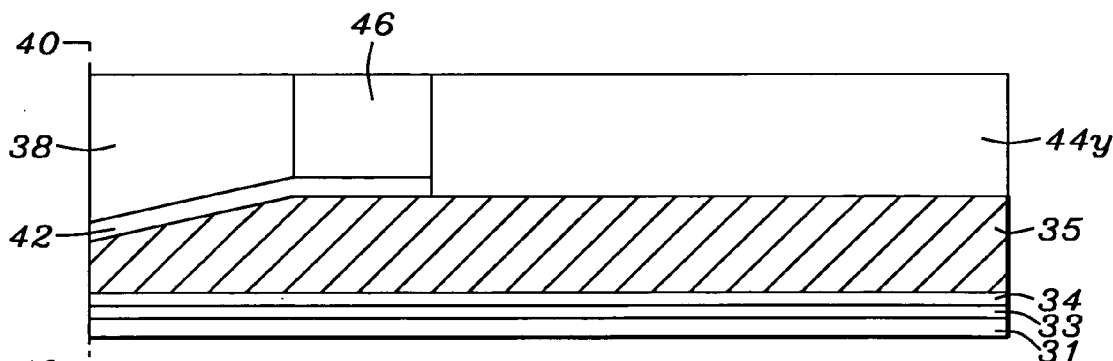
FIG. 19 is a cross-sectional view from the ABS of the PMR write head in FIG. 18 after the trailing shield is planarized.

Referring to FIG. 19, a fourth dielectric layer 46 such as alumina is formed in the opening 45 by a PVD method, for example. A CMP process may be used to planarize the fourth dielectric layer 46 to be coplanar with trailing shield 38 and top yoke 44y.

Figure 20:
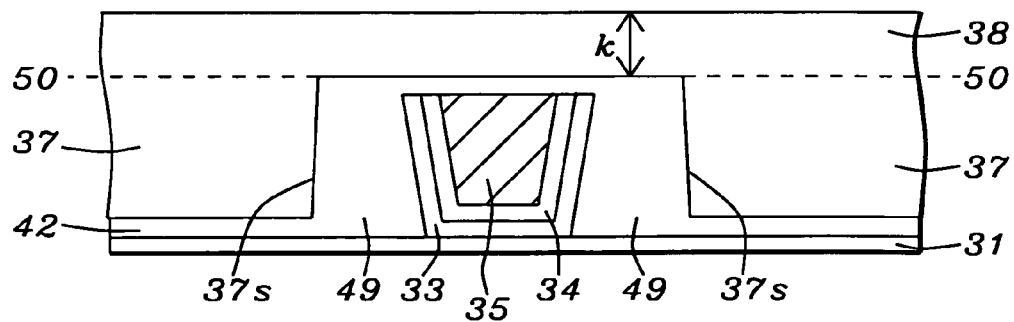
FIG. 20 is a side view of the PMR write head in FIG. 19 following an alumina deposition to fill the opening between the trailing shield and top yoke.

According to the exemplary embodiment in FIG. 20, a view from the ABS is shown of the PMR structure in FIG. 19 where the dielectric layers 32, 42 are both alumina and combined into one dielectric layer 49. In another embodiment shown in FIG. 4, all three dielectric layers 32, 33, 42 are comprised of the same insulating material such as alumina and are depicted as a single dielectric layer 49. In all embodiments, the side gap is represented by the distance between sidewall 37s and seed layer 34 and is non-conformal as defined previously. Moreover, the portion of dielectric layer 49 between trailing shield 38 and the plane including top edge 35b is the write gap. Thickness k of top shield 38 in the down track direction is between 0.25 and 0.85 microns.

We have found the non-conformal integrated side shield PMR structure as described herein results in reduced flux leakage from the main pole layer to side shield and reduced side fringe fields that enable higher track density and overwrite enhancement compared with earlier side shield designs. The integrated side shield configuration eliminates ATE caused by flux choking at a side shield and trailing shield interface since the aforementioned shields are formed as a single piece. Better cross-track profile is also achieved compared with prior art designs. The fabrication process is compatible with existing production methods and does not require investment in new equipment. Furthermore, the fabrication sequence is completed with fewer steps than prior art methods that form conformal side shields.

While this invention has been particularly shown and described with reference to, the preferred embodiment thereof, it will be understood by those skilled in the art that various changes in form and details may be made without departing from the spirit and scope of this invention.

We claim:

1. A perpendicular magnetic recording (PMR) head, comprising:
    (a) a main pole layer having a narrow pole section with two sides and a pole tip at an ABS plane, a top surface terminating at a top edge at the pole tip, and a bottom surface terminating at a bottom edge at the pole tip, and a second section adjoining the narrow pole section and formed a certain distance from the ABS wherein the second section has two sides that flare out at a certain angle from the two sides of the narrow pole section at an end opposite the ABS; and
    (b) a shield structure comprised of:
        (1) a trailing shield that is separated from the top surface of said narrow pole section and a portion of the second section by a write gap, and adjoins a side shield on opposite sides of the narrow pole section; and
        (2) a side shield having a section formed on each side of the narrow pole section and a portion of the second section, and separated from said narrow pole section and second section by a side gap layer comprised of a dielectric material wherein each side shield section has a sidewall facing the narrow pole section such that a first side gap distance between said top surface and the sidewall is less than a second side gap distance between said bottom surface and the sidewall, said first and second side gap distances are constant with increasing distance from the ABS along the narrow pole section and a portion of the second section.

2. The PMR head of claim 1 further comprised of a top yoke formed on the main pole layer and separated from the trailing shield by a dielectric layer that is disposed on the write gap.

3. The PMR head of claim 1 wherein the side gap is comprised of alumina, the first gap distance is between about 0.06 and 0.5 microns, and the second gap distance is from about 0.1 to 0.55 microns.

4. The PMR head of claim 1 wherein the write gap is comprised of alumina or another dielectric material and has a thickness of about 300 to 500 Angstroms.

5. The PMR head of claim 1 wherein the side shield is a full side shield having a bottom surface and a top surface wherein the bottom surface of the side shield has an offset of 0 to about 0.15 microns above the bottom surface of the narrow pole section and the top surface of the side shield has an offset of 0 to about 0.15 microns above the top surface of the narrow pole section along a down-track direction.

6. The PMR head of claim 1 wherein the side shield and trailing shield are comprised of CoNiFe and main pole layer is comprised of CoFe.

7. The PMR head of claim 2 wherein the trailing shield has a side along the ABS and extends a throat height distance of about 0.1 to 0.5 microns in a direction perpendicular to the ABS and towards the top yoke.

8. The PMR head of claim 1 wherein the narrow pole section and second section are tapered at an angle $\phi$ of about 30 to 40 degrees with respect to the ABS.

9. The PMR head of claim 1 wherein the trailing shield has a thickness along a down-track direction of about 0.25 to 0.85 microns.

10. A method of forming a PMR head on a substrate, comprising:
- (a) depositing a first dielectric layer having a top surface on a substrate and forming an opening with sidewalls and a bottom therein that corresponds to the shape of a main pole layer to be deposited in a subsequent step;
- (b) sequentially depositing a stack of layers on said first dielectric layer that fills said opening; said stack of layers comprises a lower second dielectric layer; a seed layer on the second dielectric layer; and a main pole layer with a bottom surface and two sidewalls contacting the seed layer wherein said main pole layer includes a narrow pole section terminating at an ABS and a second section having flared sides adjoining the narrow pole section at an end opposite the ABS;
- (c) planarizing said stack of layers along a top surface of the seed layer to provide a planar top surface of the main pole layer, and then removing a portion of said seed layer to expose a top surface of the first dielectric layer within a certain distance of the ABS;
- (d) removing exposed portions of the first dielectric layer except within a certain distance of the narrow pole section and second section;
- (e) depositing a write gap layer on the first dielectric layer and main pole layer, said write gap, first dielectric layer, and second dielectric layer together form a side gap on either side of the narrow pole section and a portion of the second section;
- (f) removing the write gap layer over a portion of the main pole layer where a top yoke is to be deposited in a subsequent step;
- (g) depositing a magnetic layer on the write gap and main pole layer comprising:
  - (1) a side shield having a sidewall on either side of the narrow pole section and along a portion of the second section, and adjacent to said side gap wherein a first side gap distance between each side shield sidewall and main pole layer sidewall along the top surface of said narrow pole section and second section is less than a second side gap distance between each side shield sidewall and main pole layer sidewall along the bottom surface of said narrow pole section and second section;
  - (2) a trailing shield formed above a top surface of said narrow pole section; and
  - (3) a top yoke formed on a portion of the main pole layer; and
- (h) forming a dielectric layer between said trailing shield and top yoke.

11. The method of claim 10 wherein said substrate is a top shield layer in an adjoining read head and the first dielectric layer is comprised of alumina.

12. The method of claim 10 wherein the second dielectric layer is comprised of alumina and is deposited by atomic layer deposition (ALD), the seed layer is comprised of Ru and is laid down by an ion beam deposition method, and the main pole layer is formed by electroplating.

13. The method of claim 10 wherein the seed layer is planarized by a chemical mechanical polish (CMP) process and is removed by a photoresist patterning and etching sequence for a certain distance of about 0.1 to 0.5 microns from the ABS.

14. The method of claim 10 wherein the write gap layer is comprised of alumina and has a thickness between about 300 and 500 Angstroms.

15. The method of claim 10 wherein the first side gap distance is between about 0.06 and 0.5 microns and the second side gap distance is from about 0.1 and 0.55 microns.

16. The method of claim 10 wherein the top yoke is comprised of CoFe and the trailing shield and side shield are comprised of CoNiFe.

17. The method of claim 10 wherein the trailing shield has a thickness from about 0.25 to 0.85 microns along a down track direction.

18. The method of claim 10 wherein the first side gap distance and second side gap distance are constant with increasing distance from the ABS, or where the first side gap distance and second side gap distance become larger with increasing distance from the ABS.

19. The method of claim 13 further comprised of an ion beam etch to form a tapered main pole layer adjacent to the ABS such that the top surface of the narrow pole section and a portion of the second section form an angle $\phi$ of about 30 to 40 degrees with respect to the ABS.

20. The method of claim 10 wherein the dielectric layer formed between the top yoke and trailing shield is comprised of alumina and is coplanar with the top yoke and trailing shield.

* * * * *

UNITED STATES PATENT AND TRADEMARK OFFICE
CERTIFICATE OF CORRECTION

| | | |
|---|---|---|
| PATENT NO. | : 8,031,433 B2 | Page 1 of 1 |
| APPLICATION NO. | : 12/231756 | |
| DATED | : October 4, 2011 | |
| INVENTOR(S) | : Cherng-Chyi Han et al. | |

It is certified that error appears in the above-identified patent and that said Letters Patent is hereby corrected as shown below:

Title Page, in the Inventors (75), delete first Inventor "Cherng-Chyi Yan, San Jose, CA (US)" and replace with -- Cherng-Chyi Han, San Jose, CA (US) --.

Signed and Sealed this
Twentieth Day of March, 2012

David J. Kappos
*Director of the United States Patent and Trademark Office*